Patented Sept. 19, 1950

2,522,668

UNITED STATES PATENT OFFICE 2,522,668

SYNTHETIC RESINS PREPARED FROM KETONE CONDENSATION PRODUCTS

James R. Dudley, Cos Cob, Conn., assignor to American Cyanamid Company, New York, N. Y., a corporation of Maine No Drawing. Application October 16, 1946, Serial No. 703,487

15 Claims. (Cl. 210—24)

1

This invention relates to synthetic resins and more particularly, to anion exchange resins, their method of manufacture, and their use in the purification of liquids.

Anion exchange resins have been prepared in the past by bringing about reaction between compounds such as guanidine with aminotriazines or urea and formaldehyde.

It is an object of the present invention to prepare improved water-insoluble granular anion exchange resins.

It is a further object of the present invention to prepare a water-insoluble anion active resin from an aminotriazine or urea, an aldehyde, and the ketone condensation product of a guanidine or a biguanide.

Still another object of the present invention is to remove anions from, or exchange anions in, liquids by means of the granular water-insoluble anion active resins here described.

These and other objects are attained by condensing a guanidine or a biguanide with a reactive ketone, insolubilizing the resulting condensation product with an aldehyde and urea or an aminotriazine, and contacting a liquid containing anions with the insoluble resin so obtained.

The invention will be described in greater detail in conjunction with the following specific examples in which the proportions are given in parts by weight unless otherwise indicated. The examples are merely illustrative, and they are not intended to restrict the scope of the invention.

Example 1

63 parts of melamine (0.5 mol)
243 parts of 37% formalin (3.0 mols as formaldehyde)
100 parts of water
4.5 parts of triethanolamine
69.5 parts of the condensation product of acetone and guanidine (0.5 mol)
88.8 parts of 37% hydrochloric acid A methylol melamine syrup is prepared by heating the melamine, formaldehyde, water and triethanolamine. The acetone-guanidine condensation product is heated therewith by means of steam until solution is complete. The solution is heated to 75° C. for 15 minutes whereupon the hydrochloric acid is added. The resin gels in about 3 minutes and is then allowed to age for about 24 hours. The gel is cured for 16 hours at 50° C. and 6 hours at 100° C., granulated, screened, and, upon evaluation found to have a density of 28.8 lbs./cu. ft. and a capacity for the removal of

2 anions from solution of 13.5 kilograins as calcium carbonate per cubic foot of resin.

Example 2

63 parts of melamine (0.5 mol)
405 parts of 37% formalin (5.0 mols as formaldehyde)
100 parts of water
4.5 parts of triethanolamine
139 parts of the condensation product of acetone and guanidine (1.0 mol)
112 parts of 37% hydrochloric acid The procedure of Example 1 is followed. The reaction mixture is heated to 83° C. for 15 minutes before the hydrochloric acid is added, after which a gel forms in about 10 minutes.

After proper aging, the resin is cured for 16 hours at 50° C. and 5 hours at 100° C. and it is then granulated, screened and evaluated. The resin has a density of 22.7 lbs./cu. ft. and a capacity for the removal of anions from solution of 17.7 kilograins as calcium carbonate per cubic foot of resin.

Example 3

63 parts of melamine (0.5 mol)
486 parts of 37% formalin (6.0 mols as formaldehyde)
100 parts of water
4.5 parts of triethanolamine
139 parts of the condensation product of acetone and guanidine (1.0 mol)
112 parts of 37% hydrochloric acid The procedure of Example 1 is followed. The reaction mixture is heated to 80° C. for 15 minutes whereupon the hydrochloric acid is added. Gel formation occurs in about 10 minutes. The gel is permitted to stand for about 24 hours and it is then broken up and cured for 16 hours at 50° C. and 7 hours at 100° C. Upon granulation, screening, and evaluation, the resin is found to have a density of 28.0 lbs./cu. ft. and a capacity for the removal of anions from solution of 19.9 kilograins as calcium carbonate per cubic foot of resin.

Example 4

31.5 parts of melamine (0.25 mol)
121.5 parts of formalin (1.5 mols as formaldehyde)
100 parts of water
5.6 parts of triethanolamine
69.5 parts of the condensation product of acetone and guanidine (0.5 mol)
73.4 parts of 37% hydrochloric acid The procedure of Example 1 is followed. The reaction mixture is heated to 65° for 6 minutes and the hydrochloric acid is added. The gel which forms is broken up and cured for 4 hours at 50° C. followed by 4 hours at 100° C. The cured resin is then ground, screened and evaluated. It has a density of 25.5 lbs./cu. ft. and a capacity for the removal of anions from solution of 21.1 kilograins as calcium carbonate per cubic foot of resin.

*Example 5*

240 parts of urea (4.0 mols)
729 parts of 37% formalin (9.0 mols as formaldehyde)
200 parts of water
10 parts of triethanolamine
139 parts of the condensation product of acetone and guanidine (1.0 mol)
114 parts of 37% hydrochloric acid A mixture of the urea, formaldehyde, triethanolamine and water is heated to 75°–80° C. until solution occurs. The acetone-guanidine condensation product is then added at 60° C. to the methylol urea syrup so prepared. After 10 minutes the hydrochloric acid is added to the reaction mixture and within 5 minutes a clear orange-colored, rigid gel forms.

The gel is broken up into small pieces and cured for 16 hours at 50° C. and for 6 hours at 100° C. The cured resin is then ground and screened to 20–40 mesh size. The product has a capacity for removing anions from solution of 1.9 kilograins as calcium carbonate per cubic foot of resin.

*Example 6*

126 parts of melamine (1.0 mol)
486 parts of 37% formalin (6.0 mols as formaldehyde)
250 parts of water
4.5 parts of triethanolamine
141 parts of the condensation product of acetone and biguanide (1.0 mol)
150 parts of 37% hydrochloric acid A methylol melamine syrup is prepared by heating the melamine, formaldehyde, triethanolamine and water to 80°–85° C. The syrup is cooled to 60° C. and the biguanide condensation product is added thereto. After intermittent heating for 10 minutes to maintain the temperature of the resulting mixture between 70°–80° C. the hydrochloric acid is added. A colorless, transparent, rigid gel is formed within 3 minutes. It is broken up into small pieces and cured for 16 hours at 50° C. and for 6 hours at 100° C. The cured resin is then ground and screened to 20–40 mesh size. The product is found to have a capacity for the removal of anions from solution of about 4.4 kilograins as calcium carbonate per cubic foot of resin.

*Example 7*

180 parts of urea (3.0 mols)
567 parts of 37% formalin (7.0 mols)
200 parts of water
10 parts of triethanolamine
141 parts of the condensation product of acetone and biguanide (1.0 mol)
114 parts of 37% hydrochloric acid The procedure of Example 6 is followed. A transparent, colorless, rigid gel forms almost immediately upon the addition of the hydrochloric acid, and after curing for 16 hours at 50° C. and for 6 hours at 100° C., grinding, and screening to 20–40 mesh size, the product is found to have a capacity for removing anions from solution of about 2.1 kilograins as calcium carbonate per cubic foot of resin.

*Example 8*

158 parts of melamine (1.25 mols)
526.5 parts of 37% formalin (6.5 mols as formaldehyde)
250 parts of water
4.5 parts of triethanolamine
123 parts of the condensation product of acetylacetone and guanidine (1.0 mol)
150 parts of 37% hydrochloric acid The procedure of Example 6 is followed and the soft, colorless gel obtained is broken up into small pieces and cured for 16 hours at 50° C. and for 6 hours at 100° C. Upon grinding and screening to 20–40 mesh, the cured product is found to have a capacity for the removal of anions from solution of about 1.5 kilograins as calcium carbonate per cubic foot of resin.

*Preparation of the condensation product of acetone and guanidine*

270 parts of guanidine carbonate plus one equivalent of potassium hydroxide (1.5 mols)
348 parts of acetone (6.0 mols)

A mixture of the ingredients is permitted to stand for 3 days at 30° C. when the potassium carbonate formed is filtered off. It is heated for 10 hours at 60° C. and the solution then evaporated. A 74% yield of a product having a melting point of 169° C. and the following analysis

|  | Percent C | Percent H | Percent N |
|---|---|---|---|
| Calculated for $C_7H_{15}N_3$ | 60.43 | 9.36 | 30.93 |
| Found | 61.26 | 9.16 | 30.10 |
|  | 61.34 | 9.50 | 30.29 | is obtained.

*Preparation of the condensation product of acetone and biguanidine*

101 parts of biguanide (1.0 mol)
120 parts of acetone (2.1 mols)
60 parts of methanol The reactants are heated together for about 30 hours at a temperature of 60° C. and the solution is then evaporated. An 85% yield of a product having a melting point of 252°–254° C. and the following analysis

|  | Percent C | Percent H | Percent N |
|---|---|---|---|
| Calculated for $C_5H_{11}N_5$ | 42.55 | 7.80 | 49.64 |
| Found | 41.41 | 7.56 | 49.23 |
|  | 41.38 | 7.54 | 49.08 | is obtained.

*Preparation of the condensation product of acetylacetone and guanidine*

180 parts of guanidine carbonate (1.0 mol)
54 parts of sodium methoxide (1.0 mol)
100 parts of acetylacetone (1.0 mol)

The above ingredients are mixed together in a suitable vessel and refluxed for about 2 to 3 hours. The sodium carbonate formed is filtered off, the filtered solution then evaporated, and the desired condensation product so isolated.

Other ketones may be condensed with guanidines or biguanides to form resin intermediates for the present invention. Ketones such as mesityl oxide, acetonyl acetone, methyl ethyl ketone, acetophenone, phorone, isophorone, kojic acid, cyclohexanone, cyclopentanone, monofurfurylidene acetone, monofurfurylidene methyl ethyl ketone, monofurfurylidene methyl isobutyl ketone, monofurfurylidene acetophenone, benzalacetone, etc., may be used.

Substituted biguanides may be condensed with any of the foregoing ketones just as biguanide itself may. Examples of suitable mono- and di-substituted biguanides are phenyl biguanide, N,N'-diphenyl biguanide, N,N-diphenyl biguanide, octadecyl biguanide, N,N- and N,N'- dioctadecyl biguanides, monobenzyl biguanide, N,N-dibenzyl- and N,N'-dibenzyl biguanides, N-ethyl-N'-benzyl biguanide, mono-furfuryl biguanide, N,N'-difurfuryl- and N,N-difurfuryl biguanides, monoethyl biguanide, N,N-diethyl, and N,N'-diethyl biguanides, butyl biguanide, isobutyl biguanide, tert. butyl biguanide and the corresponding N,N'- and N,N-dibutyl biguanides, octyl biguanide, N,N- and N,N'-dioctyl biguanides, etc. The corresponding salts such as the carbonates, acetates, etc., of the biguanides, for example, phenyl biguanide acetate, etc., may also be used.

Guanidine may be condensed with a reactive ketone and the resulting condensation product resinified as indicated in Examples 1, 2, 3, 4, 5 and 8. Substituted guanidines may also be used. Some examples of suitable mono- and di-substituted guanidines are methyl guanidine, N,N- and N,N'-dimethyl guanidines, ethyl guanidine, N,N- and N,N'-diethyl guanidine, N'-methyl-N-ethyl guanidine, phenyl guanidine, N,N-diphenyl guanidine, N,N'-diphenyl guanidine, benzyl guanidine, N,N'- and N,N-dibenzyl guanidines, furfuryl guanidine, N,N'- and N,N-difurfuryl guanidines, butyl guanidine, isobutyl guanidine, tertiary butyl guanidine and the corresponding N,N'- and N,N-dibutyl guanidines, octyl guanidine, N,N-dioctyl- and N,N'-dioctyl guanidines, octadecyl guanidine, N, N-dioctadecyl and N, N'-dioctadecyl guanidines, etc. The corresponding salts such as the carbonates, acetates, etc., of the guanidines, for example, guanidine carbonate, etc., may also be used.

Condensation products of the guanidines or biguanides and reactive ketones may be insolubilized and resinified by reaction with urea or an aminotriazine and at least one aldehyde such as, for example, formaldehyde, acetaldehyde, crotonaldehyde, benzaldehyde, furfural, etc. These intermediate products are monomeric condensation products of amidine and ketone, preferably in a molar ratio of 1:1 to 1:2. They are relatively simple organic compounds and not complex polymers.

Suitable aminotriazines include melamine, derivatives of melamine such as 2,4,6-trihydrazino-triamino-1,3,5-triazine, diaminotriazines such as the guanamines, e. g., formoguanamine, acetoguanamine, lauroguanamine, benzoguanamine, etc.

Mixtures of one or more aldehydes may be utilized as may mixtures of urea and various aminotriazines or of various aminotriazines. Similarly, small quantities of other thermo-setting resinous compositions such as phenol-formaldehyde condensation products may be incorporated in the resinous compositions of the invention.

In general, I prefer to react the ketone condensation product, urea and aldehyde in molar proportions of from about 1:3:7 to about 1:4:9 and the ketone condensation product aminotriazine and aldehyde in molar proportions of from about 1:0.5:3 to about 1:1.5:6. The invention is not, however, limited to these particular proportions.

While I do not wish to be limited to any particular theory of mechanism of the reaction which occurs in the formation of the resin intermediate, I believe that a dihydropyrimidine is formed when a guanidine is condensed with a reactive ketone. Taking for a specific illustration the reaction between guanidine itself and acetone, it may be represented as follows:

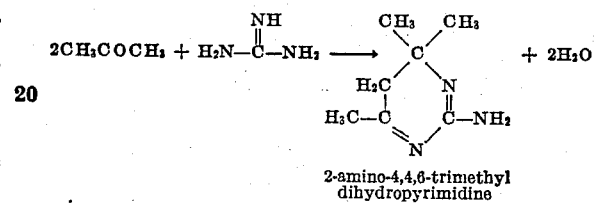

2-amino-4,4,6-trimethyl dihydropyrimidine

When a biguanide is reacted with a ketone, I believe that a substituted dihydroguanamine is formed. For example, biguanide and acetone probably react as follows:

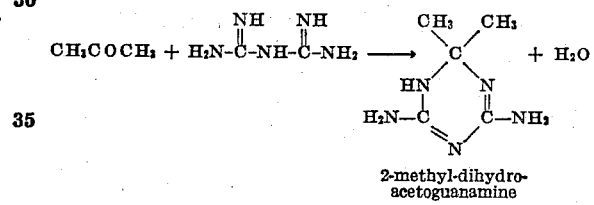

2-methyl-dihydro-acetoguanamine

The final heat treatment or curing of the resins of the present invention is preferably carried out at a temperature of 95°–105° C., although other conditions including temperatures ranging from 50° C. up to about 125° C. or higher may be used.

The anion active resins of the present invention may be activated or regenerated by means of dilute alkaline solutions, such as for example, 0.1–25% aqueous solutions of sodium hydroxide, sodium carbonate, etc.

It is preferable to grind and screen the resins to a particle size of from about 8–60 mesh. Use of larger particles causes channeling, and smaller particles of resin have been found to pack, thus reducing the anion exchange efficiency of the material.

The resinous materials produced in accordance with this invention are suitable for the removal of all kinds of acids and anions in general from liquid media. They may be used to extract the strong mineral acids (preferably in relatively low concentrations) and organic acids such as acetic acid, oxalic acid, etc., from water and organic liquids. The anions of salts such as the chloride ion of ammonium chloride and the sulfate ion of ammonium sulfate may be removed by means of the resinous products described herein.

The anion active resins are useful for many purposes examples of which are the removal of acid from water, the removal of acid from alcoholic solutions, the purification of sugar juices, the treatment of sugar solutions in general, the purification of pectin, the removal of acid from aqueous formaldehyde solutions, etc. While the anions from aqueous media, they may be used to extract acids or anions from liquid media other than water. The resins may be used as absorbents for plant nutrients and as such may be used as a media for growing plants or as a means for applying nutrients to the soil.

To be sufficiently insoluble for practical use in the water purification art, resins should have a sufficiently low solubility that they will not be dissolved very rapidly by the solution to be treated. Thus, water should not dissolve more than 1 part of resin in 1000 parts of water when passed through a bed of resin (after the first cycle comprising an activation, exhaustion and reactivation of the resin).

The term "reactive ketone," as used in the present specification and claims, is intended to cover those ketones which will react with a guanidine or a biguanide to form a condensation product which may be resinified by further treatment with urea or an aminotriazine and an aldehyde.

I claim:

1. A water-insoluble, granular, anion exchange synthetic resinous material obtained by a process including the step of heating together at least one aldehyde, a member of the group consisting of urea, diaminotriazines and triaminotriazines having a hydrogen atom attached to each amino nitrogen atom, and the organic monomeric heat condensation product of a ketone with a member of the group consisting of biguanide, mono-monovalent hydrocarbon- and furfuryl-substituted biguanide, di-monovalent hydrocarbon- and furfuryl-substituted biguanides, guanidine, mono-monovalent hydrocarbon- and furfuryl-substituted guanidines, di-monovalent hydrocarbon- and furfuryl-substituted guanidines, and their salts, the molar combined ratio of said ketone to said member in said condensation product being from 1:1 to 2:1.

2. A water-insoluble, granular, anion exchange synthetic resinous material obtained by a process including the step of heating together an aldehyde, a member of the group consisting of urea, diaminotriazines and triaminotriazines having a hydrogen atom attached to each amino nitrogen atom, and the organic monomeric heat condensation product of a ketone with guanidine in a molar ratio of 1:1 to 2:1, respectively.

3. A water-insoluble, granular, anion exchange synthetic resinous material obtained by a process including the step of heating together an aldehyde, a member of the group consisting of urea, diaminotriazines and triaminotriazines having a hydrogen atom attached to each amino nitrogen atom, and the organic monomeric heat condensation product of a ketone with biguanide in a molar ratio of 1:1 to 2:1, respectively.

4. A water-insoluble, anion exchange, granular, synthetic resinous material obtained by a process including the step of heating together formaldehyde, melamine, and the organic monomeric heat condensation product of acetone with guanidine in a molar ratio of 1:1 to 2:1, respectively.

5. A water-insoluble, anion exchange, granular, synthetic resinous material obtained by a process including the step of heating together formaldehyde, melamine and the organic monomeric heat condensation product of acetone with biguanide in a molar ratio of 1:1 to 2:1, respectively.

6. A water-insoluble, anion exchange, granular, synthetic resinous material obtained by a process including the step of heating together formaldehyde, urea and the organic monomeric heat condensation product of acetone with guanidine in a molar ratio of 1:1 to 2:1, respectively.

7. A water-insoluble, granular, anion exchange synthetic resinous material obtained by a process including the steps of heating together at least one aldehyde, a member of the group consisting of urea, diaminotriazines and triaminotriazines having a hydrogen atom attached to each amino nitrogen atom, and the organic monomeric heat condensation product of a ketone with a member of the group consisting of biguanide, mono-monovalent hydrocarbon- and furfuryl-substituted biguanides, di-monovalent hydrocarbon- and furfuryl - substituted biguanides, guanidine, mono-monovalent hydrocarbon- and furfuryl-substituted guanidines, di-monovalent hydrocarbon- and furfuryl-substituted guanidines, and their salts, causing the reaction product so obtained to gel by addition of acid, curing the gel by heating, and granulating the cured gel, the molar combined ratio of said ketone to said member in said condensation product being from 1:1 to 2:1.

8. A process which includes the step of heating together at least one aldehyde, a member of the group consisting of urea, diaminotriazines and triaminotriazines having a hydrogen atom attached to each amino nitrogen atom, and the organic monomeric heat condensation product of a ketone with a member of the group consisting of biguanide, mono-monovalent hydrocarbon- and furfuryl-substituted biguanides, di-monovalent hydrocarbon- and furfuryl-substituted biguanides, guanidine, mono-monovalent hydrocarbon- and furfuryl-substituted guanidines, di-monovalent hydrocarbon- and furfuryl-substituted guanidines, and their salts, the molar combined ratio of said ketone to said member in said condensation product being from 1:1 to 2:1.

9. A process which includes the steps of heating together an aldehyde, a member of the group consisting of urea, diaminotriazines and triaminotriazines having a hydrogen atom attached to each amino nitrogen atom, and the organic monomeric heat condensation product of a ketone with biguanide in a molar proportion of 1:1 to 2:1, respectively, causing the reaction product so obtained to gel by addition of acid, curing the gel by heating, and granulating the cured gel.

10. A process which includes the steps of heating together an aldehyde, a member of the group consisting of urea, diaminotriazines and triaminotriazines having a hydrogen atom attached to each amino nitrogen atom, and the organic monomeric heat condensation product of a ketone with guanidine in a molar proportion of 1:1 to 2:1, respectively, causing the reaction product so obtained to gel by addition of acid, curing the gel by heating, and granulating the cured gel.

11. A process for the removal of anions from liquids which comprises contacting the liquid containing anions with the water-insoluble, granular, anion exchange synthetic resinous material of claim 1, and separating the liquid from the resin.

12. The process of removing anions from liquids which comprises contacting a liquid containing anions with the water-insoluble, granular, anion exchange synthetic resinous material of claim 7, and separating said liquid from said resin.

13. The process of removing anions from aqueous solutions which comprises passing an aqueous solution containing anions through a bed of the water-insoluble, granular, anion exchange synthetic resinous material of claim 4.

14. The process of removing anions from water which comprises passing water through a bed of the water-insoluble, granular, anion exchange synthetic resinous material of claim 5.

15. The process of removing anions from water which comprises passing water through a bed of the water-insoluble, granular, anion exchange synthetic resinous material of claim 6.

JAMES R. DUDLEY.

REFERENCES CITED

The following references are of record in the file of this patent:

UNITED STATES PATENTS

| Number | Name | Date |
|---|---|---|
| 2,251,234 | Swain | July 29, 1941 |
| 2,259,169 | Little | Oct. 14, 1941 |
| 2,285,750 | Swain | June 9, 1942 |
| 2,395,825 | Hesler | Mar. 5, 1946 |

Certificate of Correction

Patent No. 2,522,668                                  September 19, 1950

JAMES R. DUDLEY

It is hereby certified that error appears in the printed specification of the above numbered patent requiring correction as follows:

Column 4, line 46, for "biguanidine" read *biguanide*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*